(12) United States Patent
Guda et al.

(10) Patent No.: US 8,904,091 B1
(45) Date of Patent: Dec. 2, 2014

(54) HIGH PERFORMANCE MEDIA TRANSPORT MANAGER ARCHITECTURE FOR DATA STORAGE SYSTEMS

(75) Inventors: Chandra M. Guda, Lake Forest, CA (US); Gregory B. Thelin, Garden Grove, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 38 days.

(21) Appl. No.: 13/334,541

(22) Filed: Dec. 22, 2011

(51) Int. Cl.
*G06F 13/00* (2006.01)

(52) U.S. Cl.
USPC .......................................... 711/103; 711/172

(58) Field of Classification Search
CPC combination set(s) only.
See application file for complete search history.

(56) References Cited

U.S. PATENT DOCUMENTS

| | | | |
|---|---|---|---|
| 5,333,138 A | 7/1994 | Richards et al. |
| 5,581,785 A | 12/1996 | Nakamura et al. |
| 5,586,291 A | 12/1996 | Lasker et al. |
| 6,016,530 A | 1/2000 | Auclair et al. |
| 6,044,439 A | 3/2000 | Ballard et al. |
| 6,115,200 A | 9/2000 | Allen et al. |
| 6,275,949 B1 | 8/2001 | Watanabe |
| 6,429,990 B2 | 8/2002 | Serrano et al. |
| 6,661,591 B1 | 12/2003 | Rothberg |
| 6,662,267 B2 | 12/2003 | Stewart |
| 6,687,850 B1 | 2/2004 | Rothberg |
| 6,725,342 B1 | 4/2004 | Coulson |
| 6,754,021 B2 | 6/2004 | Kisaka et al. |
| 6,785,767 B2 | 8/2004 | Coulson |
| 6,807,630 B2 | 10/2004 | Lay et al. |
| 6,909,574 B2 | 6/2005 | Aikawa et al. |
| 6,968,450 B1 | 11/2005 | Rothberg et al. |
| 7,017,037 B2 | 3/2006 | Fortin et al. |
| 7,028,174 B1 | 4/2006 | Atai-Azimi et al. |
| 7,082,494 B1 | 7/2006 | Thelin et al. |
| 7,107,444 B2 | 9/2006 | Fortin et al. |
| 7,120,806 B1 | 10/2006 | Codilian et al. |
| 7,136,973 B2 | 11/2006 | Sinclair |
| 7,142,385 B2 | 11/2006 | Shimotono et al. |
| 7,308,531 B2 | 12/2007 | Coulson |
| 7,334,082 B2 | 2/2008 | Grover et al. |
| 7,356,651 B2 | 4/2008 | Liu et al. |
| 7,395,452 B2 | 7/2008 | Nicholson et al. |
| 7,411,757 B2 | 8/2008 | Chu et al. |
| 7,424,577 B2 | 9/2008 | Bali et al. |
| 7,461,202 B2 | 12/2008 | Forrer, Jr. et al. |
| 7,472,222 B2 | 12/2008 | Auerbach et al. |
| 7,477,477 B2 | 1/2009 | Maruchi et al. |
| 7,509,471 B2 | 3/2009 | Gorobets |
| 7,516,346 B2 | 4/2009 | Pinheiro et al. |
| 7,610,438 B2 | 10/2009 | Lee et al. |
| 7,613,876 B2 | 11/2009 | Bruce et al. |

(Continued)

OTHER PUBLICATIONS

U.S. Appl. No. 12/720,568, filed Mar. 9, 2010, 22 pages.

(Continued)

*Primary Examiner* — Charles Rones
*Assistant Examiner* — Han Doan

(57) ABSTRACT

A data storage system is disclosed that utilizes high performance media manager transport architecture. In one embodiment, solid-state memory is connected via a bridge interface and media manager transport architecture optimizes the transfer and throughput of data communicated across the bridge. Media transport manager architecture can support reordering and interleaving of storage access commands by using priority and staging mechanisms. Balanced load of solid-state memory, parallel execution of storage access operations, improved concurrency, and increased performance can be attained.

18 Claims, 7 Drawing Sheets

(56) References Cited

U.S. PATENT DOCUMENTS

| | | |
|---|---|---|
| 7,631,142 B2 | 12/2009 | Nishide et al. |
| 7,634,585 B2 | 12/2009 | Conley et al. |
| 7,644,231 B2 | 1/2010 | Recio et al. |
| 7,685,360 B1 | 3/2010 | Brunnett et al. |
| 7,725,661 B2 | 5/2010 | Liu et al. |
| 7,752,491 B1 | 7/2010 | Liikanen et al. |
| 7,831,634 B2 | 11/2010 | Petev et al. |
| 7,861,038 B2 | 12/2010 | Fontenot et al. |
| 7,934,053 B2 | 4/2011 | Chen et al. |
| 7,962,685 B2 | 6/2011 | Cheung et al. |
| 2001/0018728 A1 | 8/2001 | Topham et al. |
| 2002/0001152 A1* | 1/2002 | Iida .................. 360/69 |
| 2005/0125614 A1 | 6/2005 | Royer |
| 2005/0172082 A1 | 8/2005 | Liu et al. |
| 2005/0251617 A1 | 11/2005 | Sinclair et al. |
| 2005/0273755 A1* | 12/2005 | Bass et al. .................. 717/100 |
| 2006/0080501 A1 | 4/2006 | Auerbach et al. |
| 2006/0143360 A1 | 6/2006 | Petev et al. |
| 2006/0143427 A1 | 6/2006 | Marwinski et al. |
| 2006/0195657 A1 | 8/2006 | Tien et al. |
| 2006/0248124 A1 | 11/2006 | Petev et al. |
| 2006/0248387 A1 | 11/2006 | Nicholson et al. |
| 2007/0174546 A1 | 7/2007 | Lee |
| 2007/0220202 A1 | 9/2007 | Sutardja et al. |
| 2007/0288692 A1 | 12/2007 | Bruce et al. |
| 2008/0005462 A1 | 1/2008 | Pyeon et al. |
| 2008/0040537 A1 | 2/2008 | Kim |
| 2008/0059694 A1 | 3/2008 | Lee |
| 2008/0126623 A1* | 5/2008 | Chang et al. .................. 710/53 |
| 2008/0130156 A1 | 6/2008 | Chu et al. |
| 2008/0141054 A1 | 6/2008 | Danilak |
| 2008/0141055 A1 | 6/2008 | Danilak |
| 2008/0177938 A1 | 7/2008 | Yu |
| 2008/0209114 A1 | 8/2008 | Chow et al. |
| 2008/0215800 A1 | 9/2008 | Lee et al. |
| 2008/0222353 A1 | 9/2008 | Nam et al. |
| 2008/0244164 A1 | 10/2008 | Chang et al. |
| 2008/0256287 A1 | 10/2008 | Lee et al. |
| 2008/0294846 A1 | 11/2008 | Bali et al. |
| 2008/0307270 A1 | 12/2008 | Li |
| 2009/0019218 A1 | 1/2009 | Sinclair et al. |
| 2009/0024793 A1 | 1/2009 | Fontenot et al. |
| 2009/0031072 A1 | 1/2009 | Sartore |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0210614 A1* | 8/2009 | Gorobets .................. 711/103 |
| 2009/0249168 A1 | 10/2009 | Inoue |
| 2009/0271562 A1 | 10/2009 | Sinclair |
| 2009/0327603 A1 | 12/2009 | McKean et al. |
| 2010/0077175 A1* | 3/2010 | Wu et al. .................. 711/172 |
| 2010/0088459 A1 | 4/2010 | Arya et al. |
| 2010/0100666 A1* | 4/2010 | Min .................. 711/103 |
| 2010/0169604 A1 | 7/2010 | Trika et al. |
| 2010/0262721 A1* | 10/2010 | Asnaashari et al. .................. 710/5 |
| 2010/0262740 A1* | 10/2010 | Borchers et al. .................. 710/263 |
| 2010/0268881 A1 | 10/2010 | Galchev et al. |
| 2010/0312950 A1* | 12/2010 | Hsieh .................. 711/103 |
| 2011/0082985 A1* | 4/2011 | Haines et al. .................. 711/154 |
| 2012/0331207 A1* | 12/2012 | Lassa et al. .................. 711/103 |

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

* cited by examiner

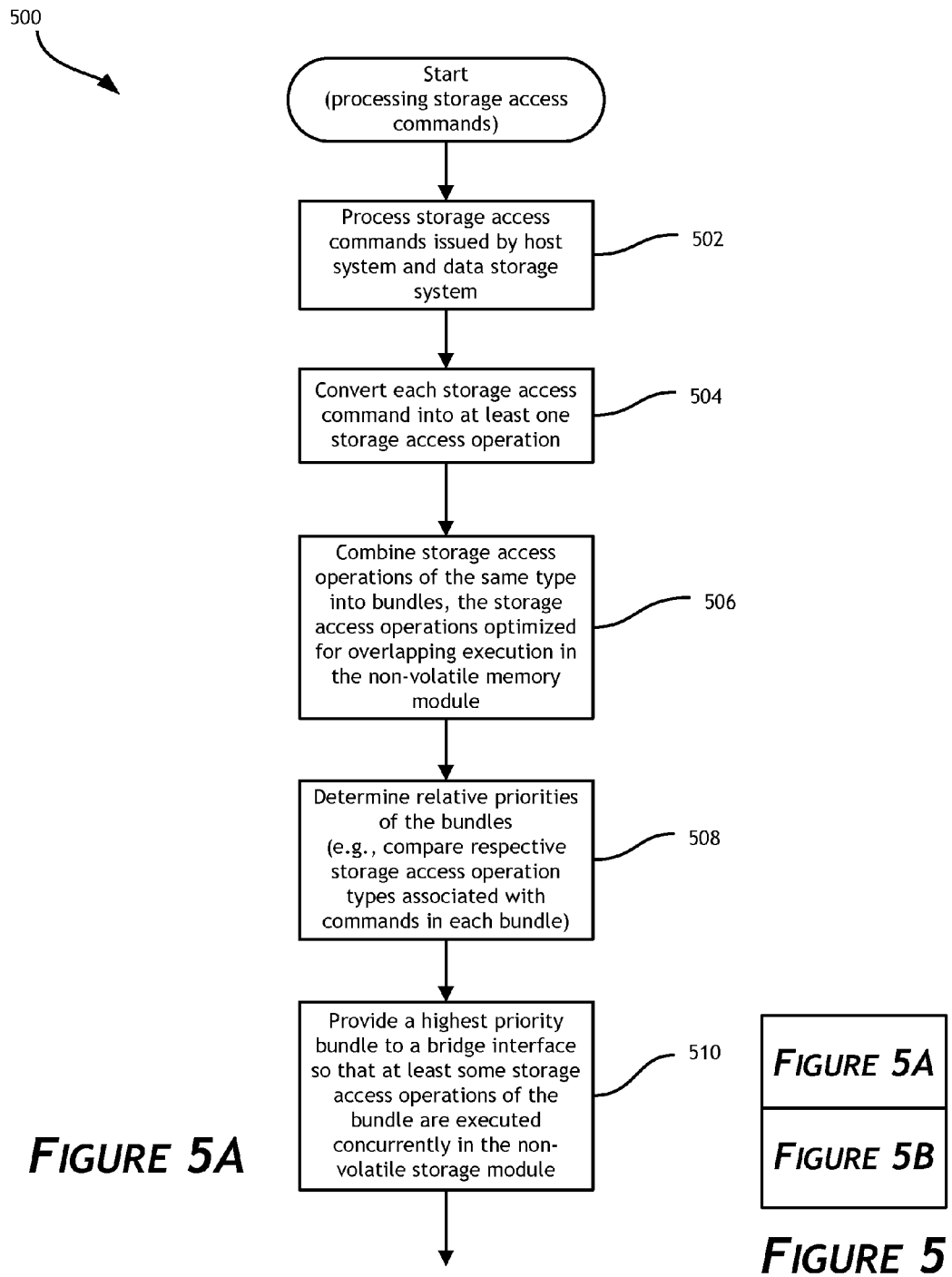

HIGH PERFORMANCE MEDIA TRANSPORT MANAGER ARCHITECTURE FOR DATA STORAGE SYSTEMS

BACKGROUND

1. Technical Field

This disclosure relates to data storage systems, such as disk drives, for computer systems. More particularly, the disclosure relates to high performance media transport manager architecture for data storage systems.

2. Description of the Related Art

Data storage systems, such as disk drives that comprise solid-state memory, are generally required to provide support for concurrent execution of data storage operations while maintaining coherency and robustness of stored data. Various data storage systems utilize bridge interfaces for accessing solid-state memory. Such bridge interface may perform some level of basic channel management of solid-state memory and support additional capabilities, such as concurrent execution of multiple commands. When solid-state memory is accessed using a bridge interface, it is important to maximize the transfer and throughput of data communicated across the bridge interface. Thus, there exists a need for an effective architecture for providing data to the bridge interface in a manner that achieves optimal performance of the data storage system.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

Figure 1:
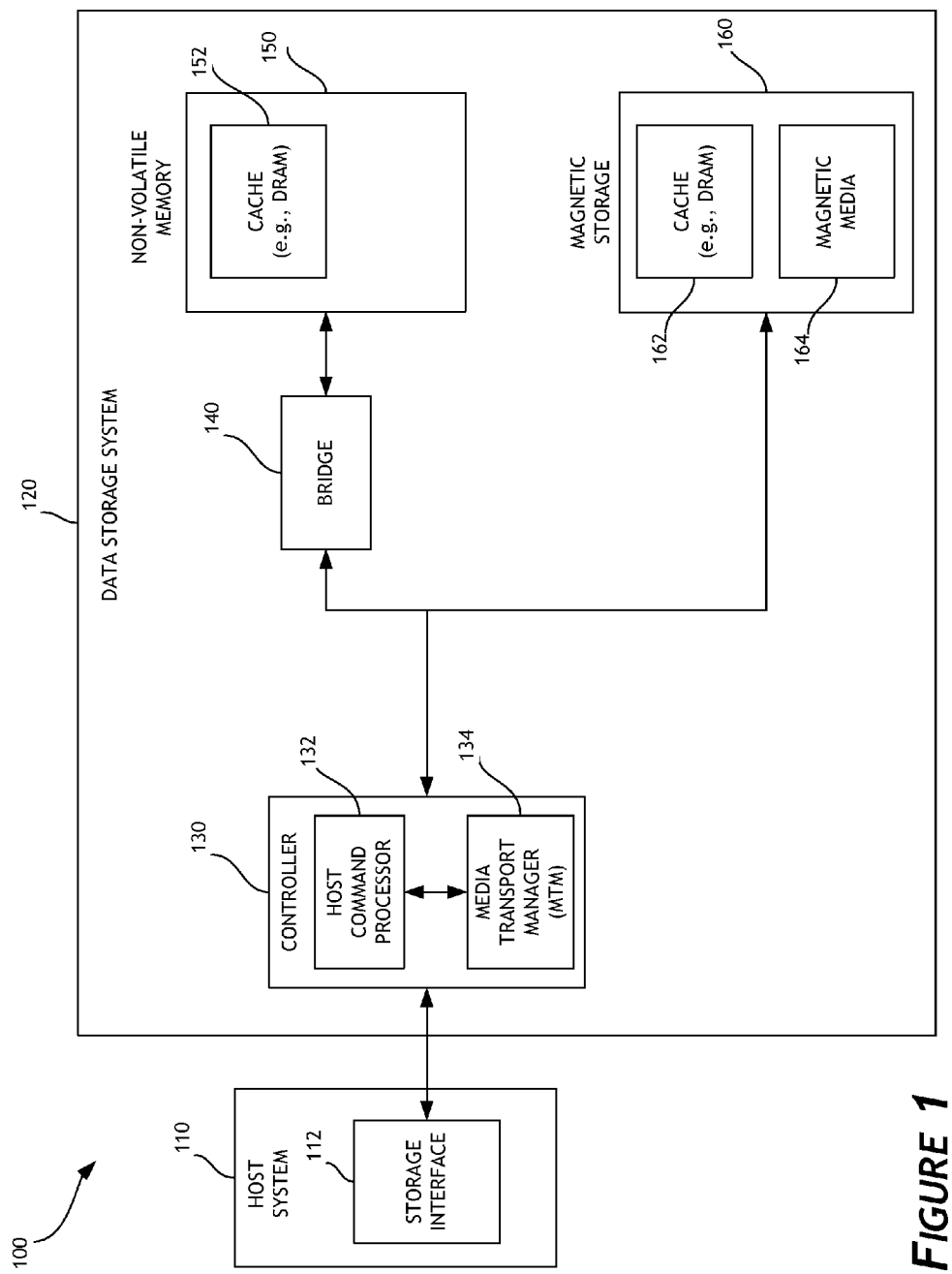
FIG. 1 illustrates a combination of a host system and a data storage system according to one embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Data storage systems, such as hard disk drives, hybrid disk drives, and solid state drives, may utilize media transport manager architectures. These architectures can be configured to perform concurrent queuing management of storage access operations received from a host system and/or internally generated by a data storage system. Media transport manager architectures can also be configured to manage different types of media utilized by the data storage system. Different types of media include non-volatile storage, such as magnetic storage, solid-state memory storage, etc., and volatile storage, such as random access memory (RAM). Solid-state memory storage comprises flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), Magnetoresistive RAM (MRAM), other discrete NVM (non-volatile memory) chips, or any combination thereof.

In some embodiments of the present invention, a data storage system, such as hybrid disk drives, comprises magnetic media along with solid-state storage, such as NAND memory. Solid-state storage memory can have multiple data and control channels so that multiple storage access operations can be executed in parallel. To achieve optimal performance, the data storage system can employ a media transport manager architecture that fully exploits parallel execution capabilities of the solid-state storage.

In some embodiments of the present invention, the data storage system uses a bridge interface for the solid-state storage. Such bridge interface may perform some level of basic channel management of solid-state memory and support additional capabilities, such as concurrent execution of multiple commands. This is further disclosed in co-pending patent application Ser. No. 13/226,393, entitled "Systems and Methods for an Enhanced Controller Architecture in Data Storage Systems," filed on Sep. 6, 2011, the disclosure of which is hereby incorporated by reference in its entirety. When solid-state memory is accessed using a bridge interface, the bridge interface may perform basic signal processing and channel management of solid-state memory, as well as some basic error correction functions and XOR parity accumulation. Such arrangement can reduce latency associated with accessing solid-state memory and improve the overall performance of the disk drive. Using a media transport manager architecture that fully exploits parallel execution capabilities of solid-state memory and maximizes the transfer and throughput of data communicated across the bridge can result in significant performance improvements.

System Overview

FIG. 1 illustrates a combination 100 of a host system and a data storage system according to one embodiment of the invention. As is shown, the data storage system 120 (e.g., a hard disk drive, hybrid disk drive, solid-state drive, etc.) includes a controller 130, a non-volatile memory module 150 connected via a bridge interface 140, and a magnetic storage module 160. The magnetic storage module 160 comprises magnetic media 164 (e.g., one or more magnetic disks) and a cache buffer 162 (e.g., DRAM). The non-volatile memory module 150 comprises non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), Magnetoresistive RAM (MRAM), other discrete NVM (non-volatile memory) chips, or any combination thereof. The non-volatile memory module 150 also comprises a cache buffer 152 (e.g., DRAM), which can be used for temporarily storing host and system data. The bridge 140 can be configured to perform basic signal processing and channel management of solid-state memory, as well as some basic error correction functions and XOR parity accumulation.

The controller 130 can be configured to receive data and/or storage access commands from a storage interface module 112 (e.g., a device driver) of a host system 110. Storage access commands communicated by the storage interface 112 can include write data and read data commands issued by the host system 110. Storage access commands can be received and processed by the host command processor 132. Read and write commands can specify a logical address (e.g., LBA) used to access the data storage system 120. The controller 130 can execute the received commands in the non-volatile memory module 150 and/or the magnetic storage module 160.

Data storage system 120 can store data communicated by the host system 110. In other words, the data storage system 120 can act as memory storage for the host system 110. To facilitate this function, the controller 130 can implement a logical interface. The logical interface can present to the host system 110 data storage system's memory as a set of logical addresses (e.g., contiguous address) where host data can be stored. Internally, the controller 130 can map logical addresses to various physical locations or addresses in the non-volatile memory module 150 and/or the magnetic storage module 160.

The controller 130 comprises a media transport manager (MTM) 134, which can be configured to manage storage operations to be executed in the non-volatile memory module 150 and/or the magnetic storage 160. The MTM 134 can be configured to arrange, reorder, prioritize, and provide to the bridge 140 storage access operations communicated by the host system 110 or generated by the data storage system 120. In one embodiment, the MTM 134 can be configured to facilitate optimal overlapping execution of storage access operations in the non-volatile memory module 150.

Figure 2A:
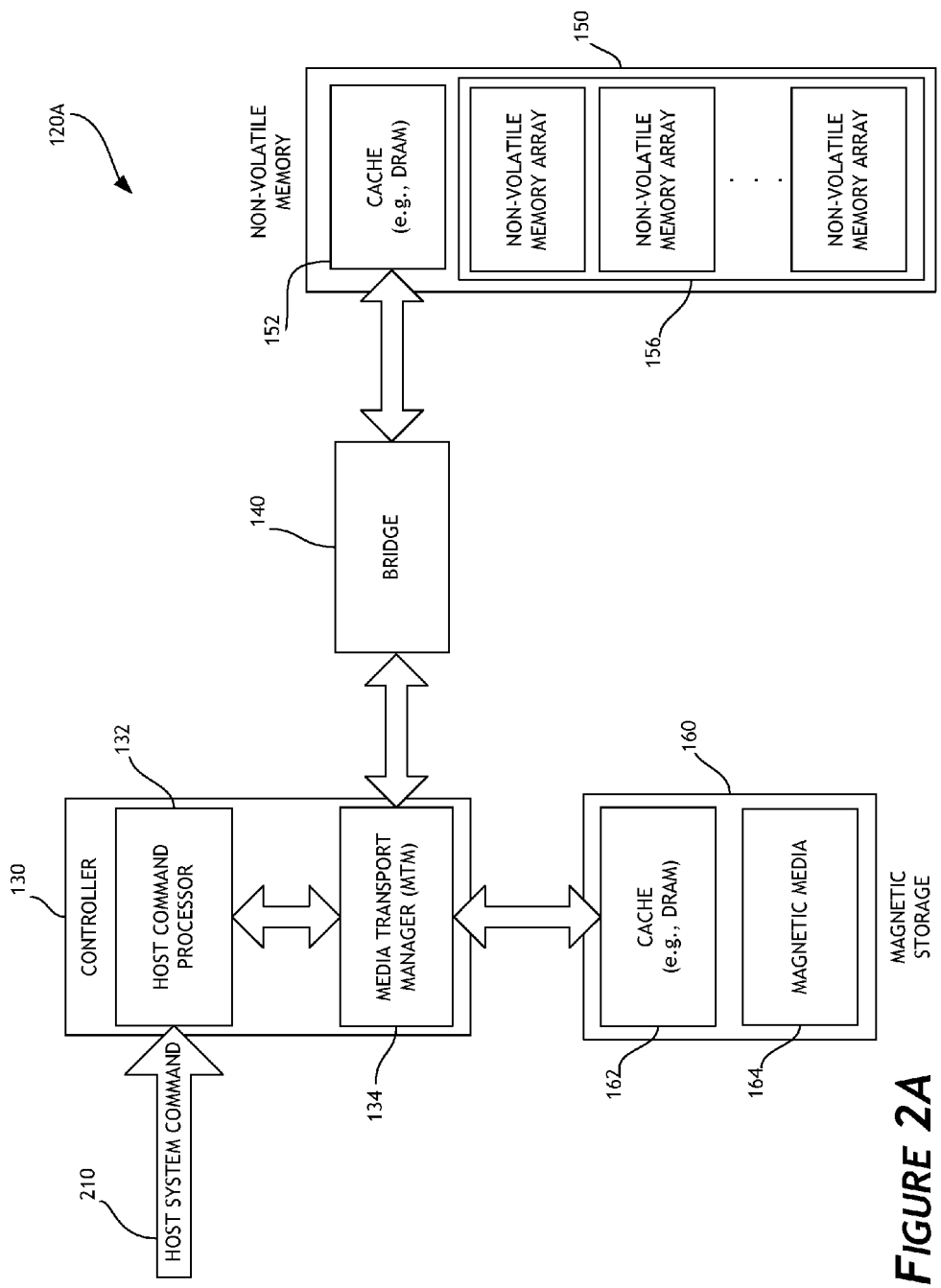
FIG. 2A illustrates a data storage system according to one embodiment of the invention.

FIG. 2A illustrates a data storage system 120A according to one embodiment of the invention. The data storage system 120A receives and processes storage access commands 210 from the host system 110. The commands 210 are communicated by the host command processor 132 to the MTM 134. The MTM determines whether a particular command 210 should be executed in the non-volatile memory module 150 and/or magnetic storage module 160. The non-volatile memory module 150 comprises one or more nonvolatile memory arrays 156, such as NAND memory arrays, NOR memory arrays, etc. The non-volatile memory module 150 interfaces the MTM 134 via the bridge 140. The non-volatile memory module 150 comprises the cache buffer 152. The magnetic storage module 160 also comprises the cache buffer 162.

Figure 2B:
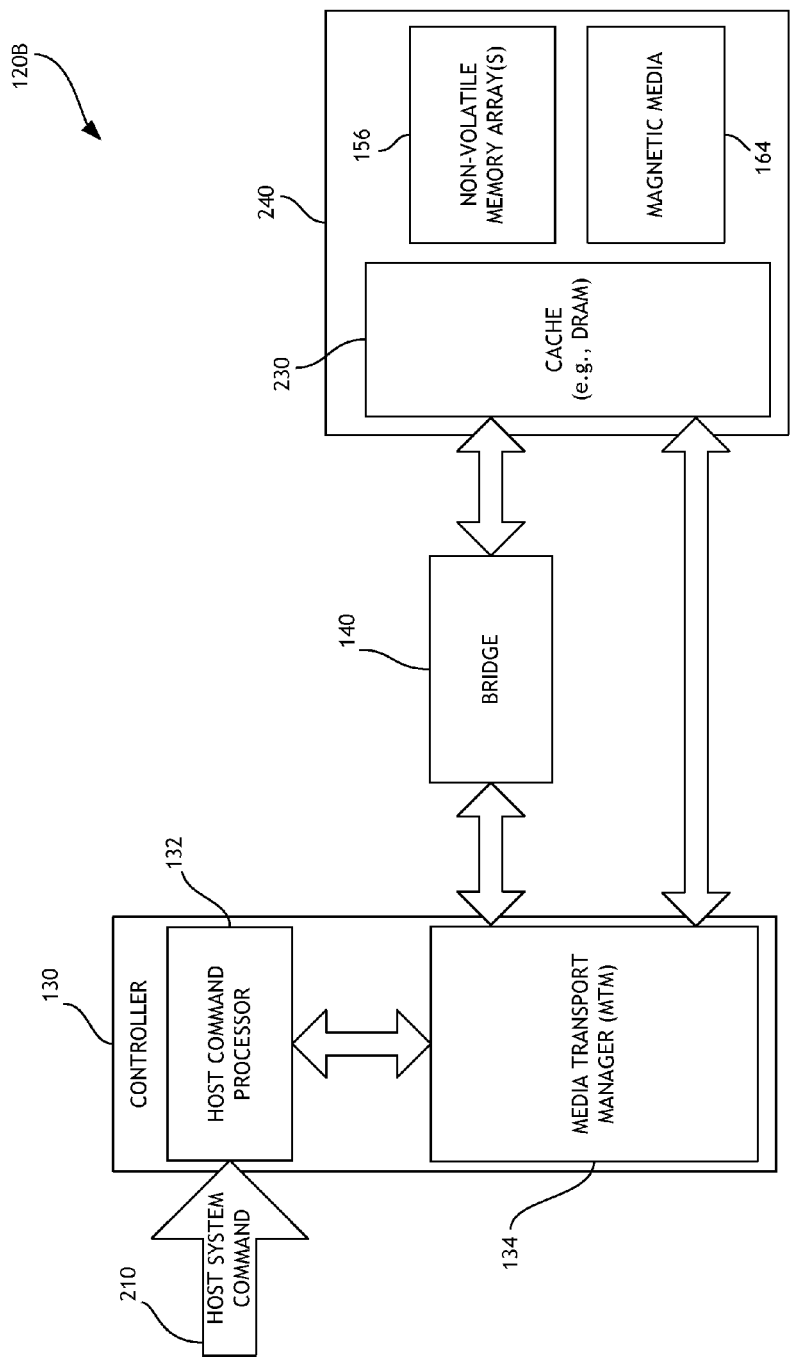
FIG. 2B illustrates a data storage system according to another embodiment of the invention.

FIG. 2B illustrates a data storage system 120B according to another embodiment of the invention. The data storage system 120B comprises a storage module 240, which includes one or more non-volatile memory arrays 156, magnetic media 164, and a cache module 230. The data storage system 120B receives and processes storage access commands 210 from the host system 110. The commands 210 are communicated by the host command processor 132 to the MTM 134. The MTM determines whether a command 210 should be executed in the non-volatile memory 156 and/or magnetic media 164. Non-volatile memory 156 interfaces the MTM 134 via the bridge 140. In one embodiment, host data can be stored either in non-volatile memory 156 or in magnetic media 164. There are no data coherency concerns in this case since only a single copy of data is stored in the data storage system 120B.

Media Transport Manager Architecture

Figure 3:
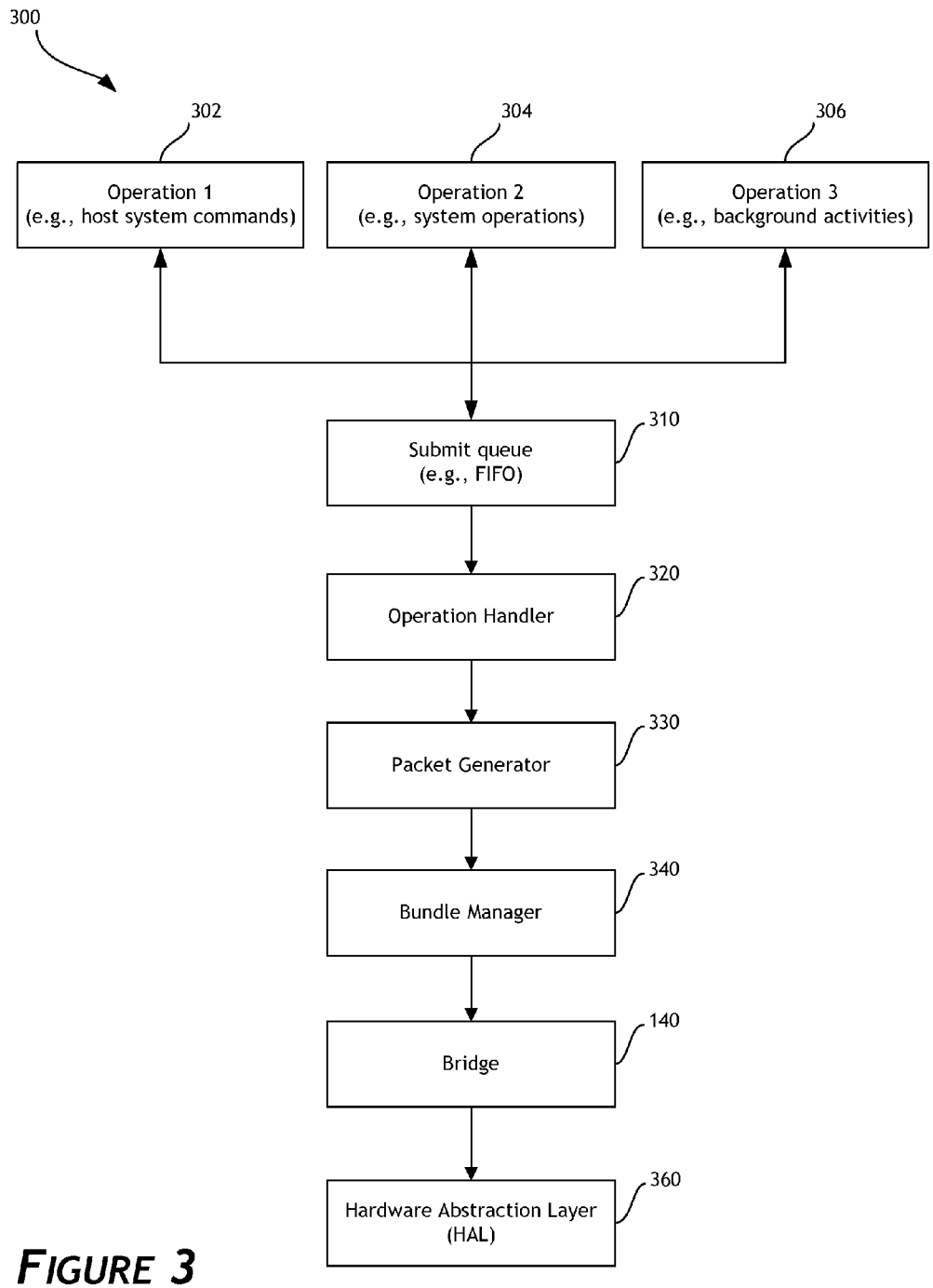
FIG. 3 illustrates a media transport manager architecture according to one embodiment of the invention.

FIG. 3 illustrates a media transport manager architecture 300 according to one embodiment of the invention. The MTM architecture 300 can be implemented by the controller 130 (e.g., the MTM 134). The MTM architecture 300 comprises one or more operations or clients 302, 304, and 306. The operations are associated with storage access commands of a certain type. For example, one type of storage access commands can be host storage access commands (e.g., read and write commands), which are depicted as operation 302. Another type of storage access commands can be system commands generated by the data storage system, which include file system operations, storing system data (e.g., metadata information), moving host data to non-volatile memory storage 150. These commands are depicted as operation 304. Yet another type of storage access commands can be background activities, such as garbage collection, wear leveling, trends monitoring, etc., which are depicted as operation 306. Those of ordinary skill in the art will appreciate that other types of operations can be included.

In one embodiment, the MTM architecture 300 can be configured so that different streams of storage commands are associated with an appropriate operation. For example, all background storage commands can be routed and handled by the operation 306. This can facilitate determining priorities of various storage commands and making decisions as to the order of execution of commands in the non-volatile memory module 150. In one embodiment, for example, storage access commands associated with background activities operation 306 may typically (but not always) be assigned a lower priority value than storage access commands associated with operations 302 and 304.

Commands are submitted to a submit queue 310. In one embodiment, there is a single submit queue 310, which can be arranged as a FIFO. In other words, storage commands are queued in a chronological order. In an alternative embodiment, more than one submit queues can be utilized and storage commands can be queued in any suitable order. Submit queue 310 can be configured to maintain separate queues or lists of different storage command types.

One or more operation handlers 320 handle operations 302, 304, and 306 queued in the submit queue 310. In one embodiment, the MTM architecture 300 ensures that each storage command is handled by an appropriate operation handler 320. In one embodiment, periodic or intermittent tasks can be associated with one of the depicted handlers or be associated with a separate handler. For example, periodically storing or flushing to non-volatile memory of mapping tables can be performed after every 1,000 write storage operations handled by the data storage system. This task can be handled by the operation handler associated with the system operations 304.

Operation handlers provide storage access commands to a packet generator 330, which converts or divides each particular storage access command into at least one storage access operation or subcommand. For example, a read data storage access command associated with several starting logical addresses can be converted to several storage access operations, each associated with a particular starting logical address of the read data storage access command. In one embodiment, each storage access operation generated by the packet generator 330 is associated with a storage access operation type, such as host system command, system operation, background activity, etc. In an alternative embodiment, the packet generator 330 can be configured to combine several storage access commands into a single operation. For example, several smaller read data storage access commands with overlapping logical addresses can be combined into a single read data storage access operation associated with the entire logical address range of the several read data commands. Although one packet generator 330 is illustrated, those of ordinary skill in the art will appreciate that more than one packet generator can be utilized.

In one embodiment, the packet generator 330 provides storage access operations to the bundle manager 340, which generates bundles that comprise one or more storage access operations. The bundle manager 340 generates bundles in accordance with a specific set of predetermined or dynamic (e.g., heuristic) rules. Many different rules can be utilized by the MTM architecture 300, such as, maximum size of a bundle as dictated at least in part by the characteristics of the bridge 140, creation of bundles comprising storage access operations of the same type, and so on. Another rule can be that once a particular function handler begins to provide storage access commands, that function handler is not interrupted until it has finished. This can help to ensure coherency of data stored in the data storage system. The bundle manager 340 can also implement a priority mechanism, whereby different storage access operations are assigned various priority values and bundles are generated to comprise storage access operations of the same or substantially same priorities.

Bundle manager 340 provides the bundles to the bridge 140, which executes storage access operations of the bundles in the non-volatile memory module 150. In one embodiment, the bridge 140 provides the bundles to a hardware access layer module 360, which in turn executes or causes the storage access operations to be executed in the non-volatile memory module 150.

Figure 4:
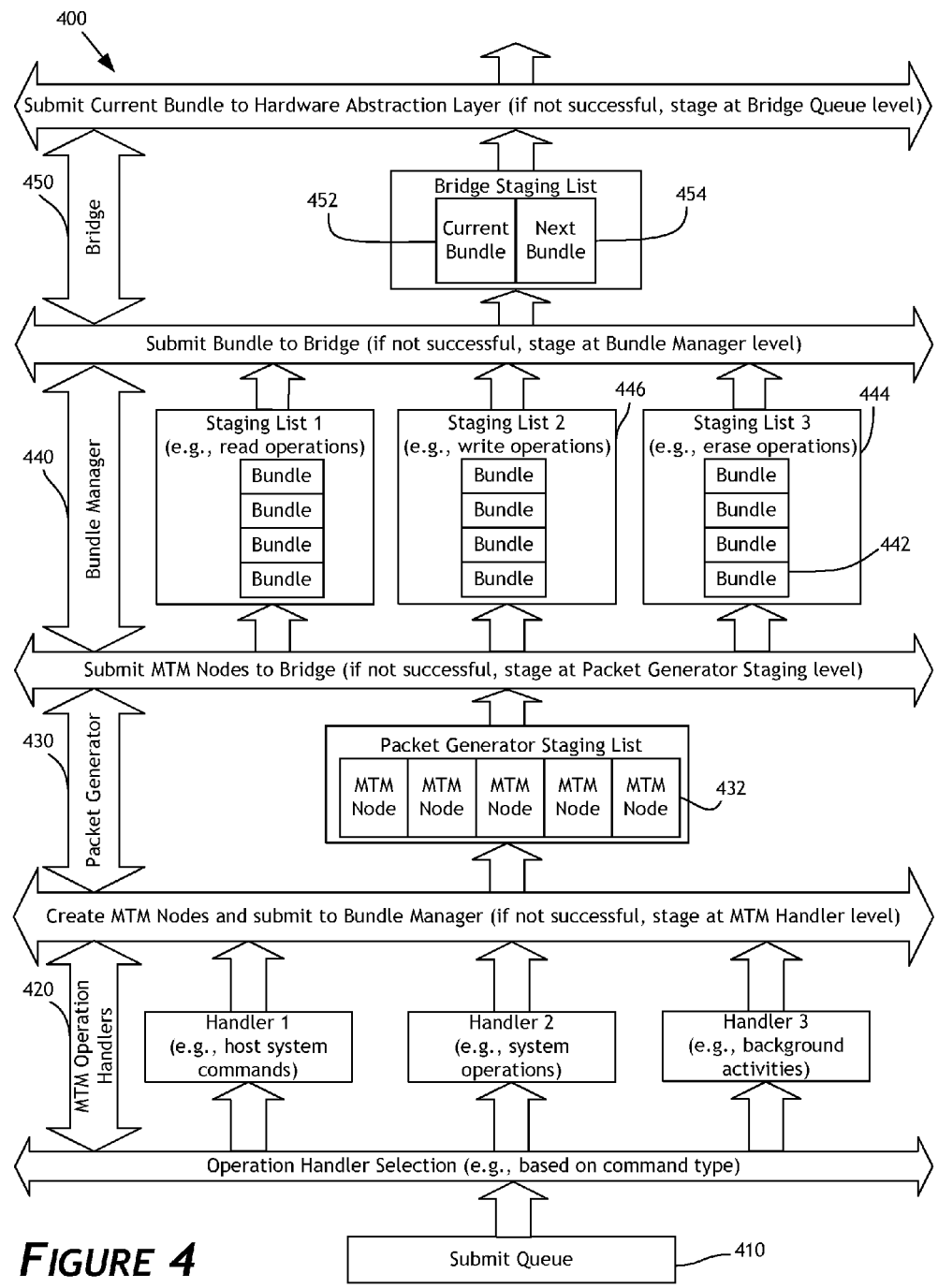
FIG. 4 illustrates an exemplary data flow through the media transport manager architecture of FIG. 3.

FIG. 4 illustrates an exemplary data flow 400 through the media transport manager architecture 300. Storage commands queued in the submit queue 410 are processed by operation handlers 420. In the illustrated embodiment, three operation handlers receive each of storage access operations 302, 304, and 306. As is explained above, those of ordinary skill in the art will appreciate that fewer or additional operation handlers can be utilized. In one embodiment, each of the handlers 420 can be associated with a particular storage command type, such as host system command, system operation, background activity, etc. In one embodiment, command types are based on an opcode associated with the storage access command.

Operation handlers 420 provide storage commands to the packet generator 430. The packet generator 430 converts or divides each particular storage access command into at least one storage access operation or subcommand, illustrated as 432. In one embodiment, each storage access operation is associated with a storage access operation type, such as host system command, system operation, background activity, etc. The packet generator 430 provides storage access operations to the bundle manager 440. According to a set of predetermined or dynamic rules, the bundle manger 440 generates bundles (illustrated as 442) that comprise one or more storage access operations. In one embodiment, several storage access operations 432 can be combined into a single storage access operation by the bundle manager 440. For example, several partial non-volatile memory page program operations can be combined or aggregated into a single full page program operation, thereby increasing efficiency and improving performance. As another example, several smaller read data operations with overlapping logical addresses can be combined into a single read data operation associated with the entire logical address range of the several read data operations.

In one embodiment, the bundle manager 440 can also implement a priority mechanism, whereby different storage access operations are assigned various priority values, and bundles are generated to comprise storage access operations of the same or substantially same priorities. In one embodiment, the bundle manager 440 assigns priority values based on the storage access operation type. As is illustrated, a list or queue 444 comprises bundles associated with erase non-volatile memory storage access operations and a list or queue 446 comprises bundles associated with write non-volatile memory storage access operations. If the MTM architecture 300 determines that the non-volatile memory module 150 does not have enough free space to store data requested to be written to the non-volatile memory, the bundle manager 440 may assign a higher priority value to the erase operations bundles than write operation bundles. This way, non-volatile memory space can be freed so that data can be stored in the non-volatile memory module 150. Conversely, if the MTM architecture 300 determines that the non-volatile memory module 150 has enough free space, write operation bundles may be assigned higher priority than erase operation bundles. As another example, storage access operations of background activity type typically (but not always) are assigned a lower priority than other storage access operation types. Accordingly, bundles comprising storage access operations associated with background activities are typically executed in the non-volatile memory module 150 after storage access operations of other types are executed.

In one embodiment, based on the assigned priority values, the bundle manager 440 provides a highest priority bundle to the bridge 450. Lower priority bundles can be stored (e.g., queued) by the bundle manger for later execution. In one embodiment, the bridge 450 can include a staging list or queue where multiple bundles are stored. As is illustrated, the queue can be configured to hold two entries: the current bundle being executed 452 and the next bundle to be executed 454. Those of ordinary skill in the art will appreciate that the queue can be configured to accommodate more or less entries. The bridge 450 can execute the storage access operations of the bundles in the non-volatile memory module 150.

In one embodiment, execution status of storage access operations of the bundle can be provided (e.g., returned by the non-volatile memory module 150) to the bridge. Execution status can comprise an indication of success, an indication of an error, or a combination of the two. In one embodiment, the bridge 450 can be configured to provide the execution status for handling to the bundle manager 440. Execution status of particular storage access operations of the bundle can be provided before other storage access operations of the bundle have been executed. In case the execution status indicates success, the bundle manager can provide successful execution status to the associated operation or client (e.g., 302, 304, or 306). In case the execution status indicates at least one error, the bundle manger 440 can determine whether the at least one error is severe enough to halt execution of the entire bundle. For example, the error may indicate that the non-volatile memory is full, and the bundle manager 440 may decide to terminate execution of a bundle containing write operations.

In one embodiment, the MTM architecture 300 may take an action based on the error. For example, the error may correspond to a read error of a non-volatile memory module 150 location. However, a valid copy of host data stored (e.g., cached) in the non-volatile memory module may reside in the magnetic medium 164. In this case, the MTM architecture 300 can instead retrieve the copy of the data from the magnetic medium 164 and provide retrieved data to the operation or client. In one embodiment, the MTM architecture 300 may also provide an error indication to inform the operation or client of the problem encountered during retrieving the data from the non-volatile memory module 150.

In one embodiment, the MTM architecture 300 is configured to determine and take into account activity levels of its components. This can be accomplished by maintaining a "state" indicator, which can indicate various activity levels, such as "free," "busy," "very busy," and so on. Depending on the activity level of the upstream component, a downstream component can be configured to "back off" and "stage" (e.g., wait) before providing data to the upstream component. As is illustrated in the embodiment shown in FIG. 4, the MTM architecture components 410, 420, 430, 440, and 450 are each configured to support staging. In other words, components 410, 420, 430, 440, and 450 include staging lists or queues where data can be maintained. For example, if the packet generator 430 is determined to be "very busy," operation handlers 420 can stage (e.g., queue) the storage access operations until the packet generator 430 is able to accept new data. In one embodiment, the state indication may reflect the number of items in a particular staging list or queue. For example, if the staging list of the packet generator 430 is ten items deep, the state indication may reflect a "very busy" condition when ten items are stored in the list.

This may be advantageous, for example, in a case of coalescing or combining multiple small storage access commands into a larger, more complete command. For instance, the host system 110 may be issuing a large number of partial page program commands. These commands may typically be handled as separate read-modify-write operations. However, if may be advantageous to wait and coalesce or aggregate multiple partial page program commands into one complete page program command, executing which would accomplish the same result more efficiently and economically.

Figure 5B:
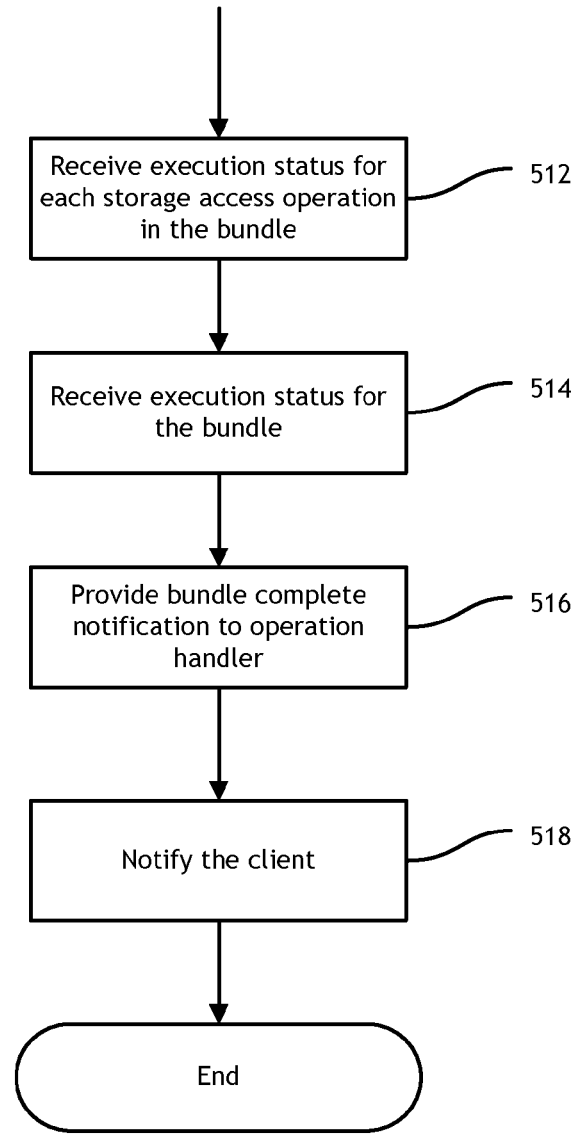
FIG. 5 illustrates a flow diagram of processing storage access commands according to one embodiment of the invention.

FIG. 5 illustrates a flow diagram 500 of processing storage access commands according to one embodiment of the invention. The process 500 can be performed by the controller 130 (e.g., the MTM 134). In one embodiment, the process 500 begins in block 502 when the data storage system processes storage access commands, which can be storage access commands issued by the host system, system commands generated by the data storage system, background activity commands generated by the data storage system, etc. In block 504 the process converts or divides each storage access command into at least one storage access operation. In one embodiment, each storage access operation is associated with a storage access operation type, such as host system command, system operation, background activity, etc.

In block 506, the process 500 combines storage access operations into bundles. In one embodiment, the process 500 combines storage access operations of the same type into bundles. The bundles are optimized for overlapping execution of storage access operations in the non-volatile memory module 150. In one embodiment, the process 500 creates bundles so that at least some storage access operations of a particular bundle are concurrently executed in the non-volatile memory module 150. In another embodiment, all storage access operations of the particular bundle are concurrently executed in the non-volatile memory module 150.

In block 508, the process 500 determines or assigns priority to the bundles. In one embodiment, the process 500 assigns priorities based on the type of storage access operations in the bundle. As explained above, storage access operations of background activity type typically (but not always) are assigned a lower priority than other storage access operation types. In one embodiment, the process 500 selects in block 510 a bundle having the highest priority and provides that bundle to the bridge 140 for execution in the non-volatile memory module 150. As mentioned above, the bundle can be generated such that at least some (or all) storage access operations of the bundle are executed concurrently.

In block 512, the process 500 receives from the non-volatile memory module 150 execution statuses of each storage access operation in the bundle. In one embodiment, the process 500 receives an execution status of a particular storage access operation as soon as it has been completed. In another embodiment, the bridge 140 delays communicating individual execution statuses, and instead combines multiple execution statuses into a single (or multiple) message. This may minimize the traffic over the bridge 140 and, thereby, reduce latency and improve performance.

In block 514, the process 500 receives an execution status for the entire bundle when all storage access operations of the bundle have been executed. In block 516, the process 500 provides bundle complete indication to a respective operation handler, which in turn causes the operation or client to be notified in block 518. In one embodiment, such notification informs the operation or client that a particular storage access command has been executed.

Conclusion

To achieve optimal performance, a data storage system can utilize a media transport manager architecture that fully exploits parallel execution capabilities of solid-state memory. Especially when solid-state memory is connected via a bridge interface, the MTM architecture can be configured to optimize the transfer and throughput of data communicated across the bridge. The MTM architecture can support reordering and interleaving of storage access commands by using priority and staging mechanisms. Balanced load of solid-state memory can be achieved, whereby the MTM architecture keeps the bridge busy, and therefore keeps the solid-state memory busy. Improved concurrency and increased performance can be attained.

Other Variations

Those skilled in the art will appreciate that in some embodiments, other types of media transport architectures can be implemented. In addition, the actual steps taken in the disclosed processes, such as the process illustrated in FIG. 5, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. In a data storage system comprising a magnetic medium, a non-volatile memory module, and a bridge interface for the non-volatile memory module, a method of optimizing execution of storage access commands, the method comprising:
   receiving a plurality of storage access commands from a host system, the plurality of storage access commands comprising a first subset of storage access commands of a first storage access command type and a second subset of storage access commands of a second storage access command type different from the first storage access command type;
   converting at least some storage access commands into a plurality of storage access operations, wherein each storage access operation is associated with a storage access operation type;
   combining a plurality of storage access operations of a first storage access operation type into a first bundle, the plurality of storage access operations combined into the first bundle being associated with the first subset of storage access commands, the combining performed without an interruption to process a plurality of storage access commands associated with the second subset of storage access commands, wherein the plurality of storage access operations in the first bundle are optimized for overlapping execution in the non-volatile memory module; and
   providing the first bundle to the bridge interface so that at least some storage access operations of the first bundle are concurrently executed in the non-volatile memory module prior to executing at least some storage access operations associated with a storage access command received prior to receipt of one or more storage access commands associated with the plurality of storage access operations in the first bundle;
   determining a status of execution in the non-volatile memory module of a subset of storage operations of the plurality of storage operations of the first bundle;
   providing the status of execution to a controller of the data storage system while at least some storage access operations of the first bundle that are not in the subset of storage access operations are being executed in the non-volatile memory module; and
   based at least in part on the status of execution, terminating execution of the storage access operations of the first bundle and performing an additional operation in the magnetic medium.

2. The method of claim 1, further comprising:
   combining a plurality of the storage access operations of a second storage access operation type into a second bundle, wherein the second storage access operation type is different from the first storage access operation type;
   determining a first priority value associated with the first bundle and a second priority value associated with the second bundle; and
   if the second priority value exceeds the first priority value, providing the second bundle to the bridge interface for execution in the non-volatile memory prior to providing the first bundle to the bridge interface.

3. The method of claim 2, wherein the first priority value is associated with the first storage access operation type of the first bundle and the second priority value is associated with the second storage access operation type of the second bundle.

4. The method of claim 3, wherein:
   the first storage access operation type of the first bundle corresponds to a write operation type;
   the second storage access operation type of the second bundle corresponds to an erase operation type; and
   the second priority value exceeds the first priority value when the non-volatile memory module does not comprise enough free space to store host data associated with the plurality of storage access operations of the first bundle.

5. The method of claim 2, further comprising placing the second bundle in a queue behind the first bundle when the second priority value does not exceed the first priority value.

6. The method of claim 1, further comprising:
   combining a plurality of background storage access operations issued by the data storage system into a second bundle;
   providing the second bundle to the bridge interface after providing the first bundle to the bridge interface so that the plurality of storage access operations of the first bundle are executed before starting execution of the plurality of storage access operations of the second bundle.

7. The method of claim 1, further comprising:
   prior to providing the first bundle to the bridge interface, determining whether the bridge interface is busy; and
   if the bridge interface is determined to be busy, waiting until the bridge interface is free before providing the first bundle to the bridge interface.

8. The method of claim 1, wherein the first storage access operation type is based at least in part on a storage access operation opcode.

9. A data storage system comprising:
   a magnetic medium configured to store data;
   a non-volatile memory module configured to store data; and
   a controller configured to access the non-volatile memory module using a bridge interface, wherein the controller is further configured to:
   convert at least some storage access commands of a plurality of storage access commands received from a host system into a plurality of storage access operations, wherein the plurality of storage access commands comprises a first subset of storage access commands of a first storage access command type and a second subset of storage access commands of a second storage access command type different from the first storage access command type, wherein each storage access operation is associated with a storage access operation type;
   combine a plurality of storage access operations of a first storage access operation type into a first bundle, the plurality of storage access operations combined into the first bundle being associated with the first subset of storage access commands, wherein the controller is configured to combine the plurality of storage access operations into the first bundle without an interruption to process a plurality of storage access commands associated with the second subset of storage access commands, and wherein the plurality of storage access operations in the first bundle are optimized for overlapping execution in the non-volatile memory module; and provide the first bundle to the bridge interface so that at least some storage access operations of the first bundle are concurrently executed in the non-volatile memory module prior to executing at least some storage access operations associated with a storage access command received prior to receipt of one or more storage access commands associated with the plurality of storage access operations in the first bundle;

determine a status of execution in the non-volatile memory module of a subset of storage operations of the plurality of storage operations of the first bundle;

provide the status of execution to the controller while at least some storage access operations of the first bundle that are not in the subset of storage access operations are being executed in the non-volatile memory module; and based at least in part on the status of execution, terminate execution of the storage access operations of the first bundle and perform an additional operation in the magnetic medium.

10. The data storage system of claim 9, wherein the controller is further configured to:

combine a plurality of the storage access operations of a second storage access operation type into a second bundle, wherein the second storage access operation type is different from the first storage access operation type;

determine a first priority value associated with the first bundle and a second priority value associated with the second bundle; and if the second priority value exceeds the first priority value, provide the second bundle to the bridge interface for execution in the non-volatile memory module prior to providing the first bundle to the bridge interface.

11. The data storage system of claim 10, wherein the first priority value is associated with the first storage access operation type of the first bundle and the second priority value is associated with the second storage access operation type of the second bundle.

12. The data storage system of claim 11, wherein:

the first storage access operation type of the first bundle corresponds to a write operation type;

the second storage access operation type of the second bundle corresponds to an erase operation type; and the second priority value exceeds the first priority value when the non-volatile memory module does not comprise enough free space to store host data associated with the plurality of storage access operations of the first bundle.

13. The data storage system of claim 10, wherein the controller is further configured to place the second bundle in a queue behind the first bundle when the second priority value does not exceed the first priority value.

14. The data storage system of claim 9, wherein the controller is further configured to:

combine a plurality of background storage access operations issued by the data storage system into a second bundle;

provide the second bundle to the bridge interface after providing the first bundle to the bridge interface so that the plurality of storage access operations of the first bundle are executed before execution of the plurality of storage access operations of the second bundle is started.

15. The data storage system of claim 9, wherein the controller is further configured to:

prior to providing the first bundle to the bridge interface, determine whether the bridge interface is busy; and if the bridge interface is determined to be busy, wait until the bridge interface is free before providing the first bundle to the bridge interface.

16. The data storage system of claim 9, wherein the first storage access operation type is based at least in part on a storage access operation opcode.

17. The method of claim 1, wherein the first storage access operation type of the first bundle corresponds to a read operation type and the method further comprises:

terminating execution of the storage access operations of the first bundle in response encountering one or more errors during reading data stored in the non-volatile memory module; and retrieving the data from the magnetic medium.

18. The data storage system of claim 9, wherein the first storage access operation type of the first bundle corresponds to a read operation type and the controller is further configured to:

terminate execution of the storage access operations of the first bundle in response encountering one or more errors during reading data stored in the non-volatile memory module; and retrieve the data from the magnetic medium.

* * * * *